3,443,243
FREQUENCY SELECTIVE LASER
Chandra K. N. Patel, Chatham, N.J., assignor to Bell Telephone Laboratories, Incorporated, New York, N.Y., a corporation of New York
Filed June 23, 1965, Ser. No. 466,392
Int. Cl. H01s 3/10, 3/22; G02b 5/18
U.S. Cl. 331—94.5                    5 Claims

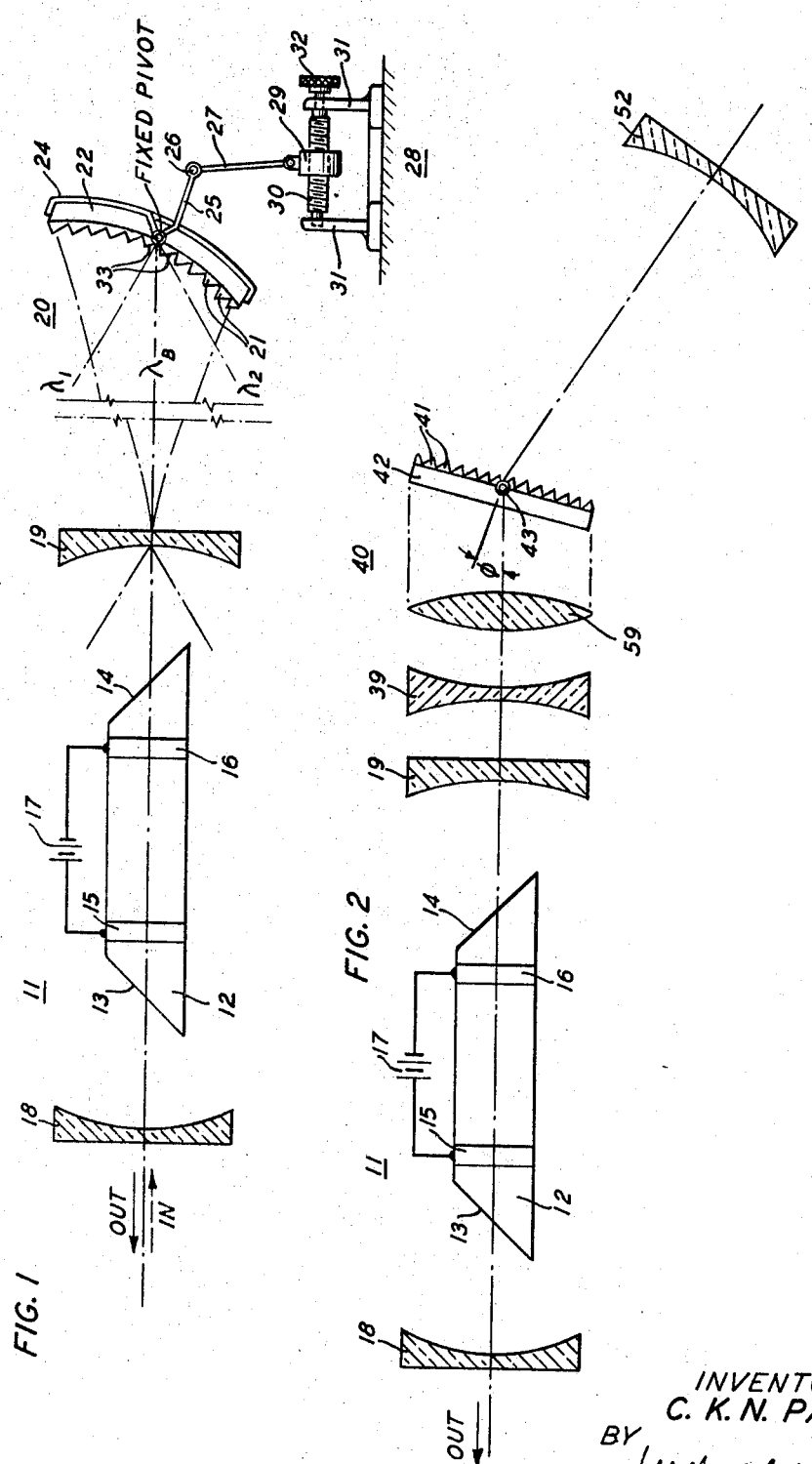

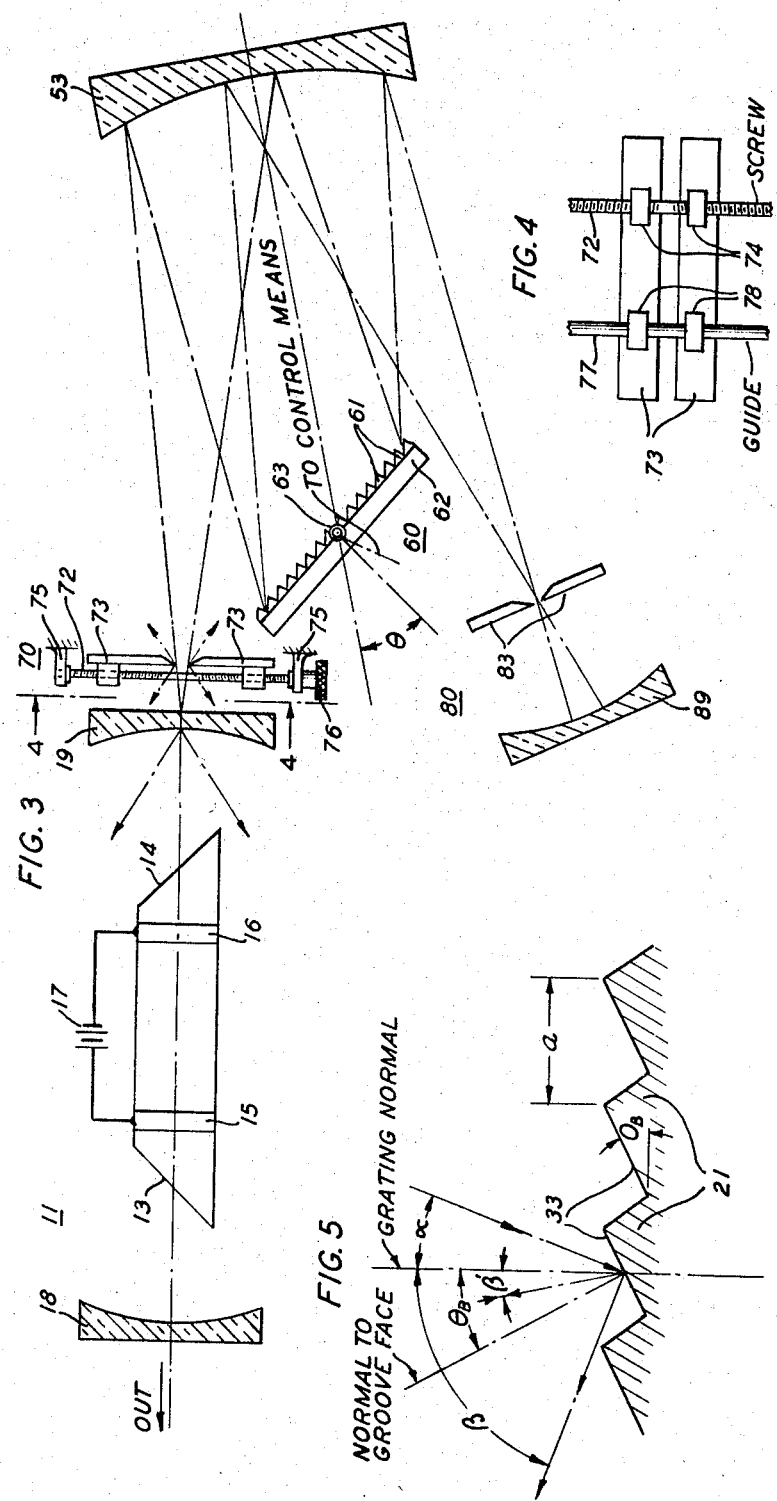

ABSTRACT OF THE DISCLOSURE

A frequency-selective vibrational-rotational level molecular laser is disclosed. In a carbon dioxide laser operating at 10.6 microns, selection among different vibrational-rotational transitions is provided by applying the principles of the spectrometer. A diffraction-grating apparatus is disposed outside of the laser resonator and adapted to provide substantial angular dispersion of the differing-frequency radiations transmitted from the resonator. The resonator itself is adapted, either with apertures or a curved partially transmissive reflector, to provide further angular dispersion of the differing-frequency radiations, which are returned from the grating to the resonator.

---

This invention relates to frequency selection in apparatus for the stimulated emission of radiation. Such apparatus is frequently called a laser, or optical maser, and may operate either in oscillating or amplifying modes.

The problem of frequency selection is most readily understood in connection with laser apparatus operating in the oscillating mode. Laser apparatus typically has a pair of reflecting elements that form a resonator for the stimulated radiation. Such a resonator has a degree of frequency selectivity. Nevertheless, various line-broadening effects exist in the laser active materials. For example, the Doppler-effect broadening exists in a gas laser. As a consequence of such line-broadening effects, most two-reflector resonators will resonate at a plurality of discrete frequencies and different wave modes which are provided with gain above the oscillation threshold.

Various proposals have heretofore been made for improving the frequency-selectivity and mode-selectivity of laser apparatus.

Among these are the disposition of a third reflector outside the resonator in line with its usual two reflectors, as disclosed, for example, in Kisliuk et al. Patent No. 3,134,837, issued May 26, 1964. Such proposals frequently do not resolve closely spaced laser frequencies having similar modes, such as may be obtained when the laser active material has several closely spaced lines that can laser simultaneously. I have found this problem to be particularly challenging in a laser operating upon transitions between closely spaced vibrational or rotational energy states, inasmuch as each vibrational state is split by a plurality of rotational energy states. For example, the $N_2$-$CO_2$ laser disclosed in my copending application, Ser. No. 409,682, filed Nov. 9, 1964 and assigned to the assignee hereof, is such a laser.

Another proposal for laser frequency selection involves the disposition of a dispersive prism or similar element within the resonator or the use of a dispersive reflector, such as an echelon grating, as one of the two reflectors of the resonator. The resolution provided by this arrangement is still not sufficient to discriminate consistently among the closely spaced frequencies and similar modes obtainable in a rotational-vibrational level laser.

It is an object of my invention to provide improved resolution among closely spaced laser frequencies.

My invention resides in the recognition that as much resolution as provided by a spectrometer can be obtained in a laser resonator by providing frequency-responsive diffractive feedback from a point external to the primary reflectors through an aperture, which is advantageously provided by a curved focusing element employed as one of the primary reflectors.

Specifically, a diffraction grating assembly is disposed beyond the curved focusing element to return radiation of selected frequency toward the active material; and the curved focusing element, by the defocusing inherent for reverse transmission, acts as the aperture of a spectrometer. In one species of the invention, the diffraction grating assembly comprises a reflection grating. In another species of the invention, the assembly comprises a transmission grating and a separate reflecting element. In either case, focusing may be provided by the reflecting element. Means for varying the effective aperture may likewise be provided.

A fuller understanding of my invention may be obtained from the following detailed description in conjunction with the accompanying drawing in which:

FIG. 1 is a partially pictorial and partially schematic showing of an embodiment of the invention employing a reflection grating;

FIG. 2 is a partially pictorial and partially schematic showing of an embodiment of the invention employing a transmission grating;

FIG. 3 is a modification of the embodiment of FIG. 1 to include means for controlling the effective aperture for the feedback radiation;

FIG. 4 is a front view of the variable aperture mechanism of FIG. 3; and

FIG. 5 is an enlarged sectional view of diffraction grating elements showing relevant characteristics thereof.

In the embodiment of FIG. 1, there is provided a laser 11 which comprises a tube 12 having Brewster angles end windows 13 and 14 and containing an active gaseous medium, excitation means including electrodes 15 and 16 and voltage source 17, and the end reflectors 18 and 19 which form a resonator. Disposed beyond reflector 19 along the axis of laser 11 is a concave reflection grating 20 having plastic grating elements 21 and the glass substrate 22 to which the grating elements are bonded. The grating elements 21 have an aluminized surface or other reflective coating thereon. The reflection grating also includes the metal frame 24, a fixed pivot 23, lever arm 25, the free pivot 26, and the connecting arm 27 and control means 28. The control means 28 includes the movable nut 29 which is pivotally attached to connecting arm 27, the threaded element 30 which engages mating threads within nut 29, the fixed end mountings 31 for the threaded element 30 and the knurled knob 32 which permits manual rotation of the threaded element 30 to control the tilt of the reflection grating 20. The tilt of the grating, that is the angle between the grating normal and the axis of laser 11, is illustratively 15°, and the normal to a groove face 33 at the center of the grating is aligned with the axis of laser 11. The spacing of the grating elements 21 is illustratively 20.48μ when the 10.6μ transition in $CO_2$ is to be amplified selectively. This spacing is indicated by the dimension $a$ in FIG. 5.

One of the problems to which the invention is directed, namely the resolution of a plurality of closely spaced electronic transitions which tend to lase simultaneously, occurs most often in a gaseous laser. Thus, illustratively the gaseous medium within tube 12 comprises 0.4 torr of carbon dioxide gas as the active gas and 0.4 torr of nitrogen gas as a carrier gas. This mixture provides the possibility of a laser action upon a number of especially close transitions in the carbon dioxide. The gas mixture may be static within tube 12; or means (not shown) for providing continuous flow of the gas mixture may be included. Optionally, there may also be provided means (not shown) for exciting the nitrogen outside the container 12 and mixing it with nonexcited carbon dioxide within tube 12, as disclosed in my above-cited copending patent application. In the latter case, the excitation means may simply be means for heating the nitrogen gas outside of container 12, instead of voltage source 17 and the electrodes 15 and 16.

The concave end reflectors 18 and 19 may be spaced in the near-confocal manner well known in the art, each being both partially reflective and partially transmissive.

The grating elements 21 have characteristics that will be more fully described hereinafter in connection with FIG. 5. The curvature of the glass substrate 22 is determined by the diffractive spreading and other spreading of the light beam emerging from reflector 19 and by the desirability of having light rays substantially normally incident, or at least incident at like angles, upon all groove faces 33 of the diffraction grating elements 21, as shown in FIG. 5. This curvature also focuses the desired radiation back toward its point of origin. The reflection grating 20 is preferably spaced from reflector 19 by about five times the spacing between reflectors 18 and 19 to permit the mode and frequency selectivity to be determined primarily by the grating characteristics.

The operation of the embodiment of FIG. 1 may be explained as follows:

The closely spaced laser transitions in laser 11 for the specific $CO_2$-$N_2$ gaseous mixture of the preferred embodiment are transitions associated with rotational levels that split the vibrational energy levels within the carbon dioxide gas. Many of the possible transitions will derive enough gain to sustain oscillation. Even a third reflector disposed in the position of grating 20, while mode selective, ordinarily would not discriminate among similar modes which might be present at slightly different frequencies. The extraordinary resolution required to discriminate such closely spaced frequencies is provided by the combination of reflection grating 20 and the reflector 19, which act as the grating and aperture, respectively, of a spectrometer. As is known from the spectrometer art, the wavelength that will be passed by the aperture must be one for which constructive interference of diffracted wavelets from the various groove faces will occur and is related to the grating element spacing and the orientation of the grating elements according to the relationship.

$$m\lambda = a (\sin \alpha \pm \sin \beta) \quad (1)$$

where $m$ is the order of the diffraction mode that is directed back toward the aperture, $\lambda$ is the wavelength of the transmitted radiation, $a$ is the grating element spacing, $\alpha$ is the angle between the grating normal and the incident rays of light, and $\beta$ is the angle between the grating normal and the diffracted rays. The plus sign is used when the incident and diffracted rays are on the same side of the grating normal; and the minus sign is used when they are on opposite sides of the grating normal, as illustrated for a single grating element in FIG. 5 for the general case. For purposes of the invention, the incident and diffracted rays of interest are on the same side of the grating normal at an angle B', as illustrated in FIG. 5. It is to be noted that the above relationship can not be derived by considering the single grating element, inasmuch as, for most frequencies, the combined interference effect of the diffracted rays from all grating elements is different from the interference effect occurring in conventional reflection from a planar surface.

It is desired that a diffracted wave of selected frequency will be returned in exactly the direction from which it came; that is, the direction of the incident light is desired to be the direction of the constructively interfering diffracted rays of selected frequency. For this case, Equation 1 above becomes:

$$m\lambda = 2a \sin \beta' \quad (2)$$

where, in general, $\beta'$ is as indicated in FIG. 5. When $\beta'$ is equal to the blaze angle $\theta_B$ of the grating elements, i.e., when the angle of tilt of the grating assembly 20 is equal to the angle $\theta_B$ between the grating normal and the groove face normal so that the groove face normal lies along the axis of laser 11, then $\lambda_B$ the first order blaze wavelength equals:

$$\lambda_B = 2a \sin \theta_B \quad (3)$$

The grating is also blazed for the second order diffracted ray of half of the wavelength $\lambda_B$ and, in general, for the $n$th order diffracted ray of $1/n$ times the wavelength $\lambda_B$. The energy of the returned wavelength is highly concentrated within a limited angular region for $\beta' = \theta_B$.

If the tilt of the grating is changed without changing the blaze angle $\theta_B$ of the grating elements, Equation 2 above applies, and a wavelength different from the blazed wavelength will in general be returned in the incidence direction. The spectral energy returned is in general less concentrated within the desired angular region than for the blazed wavelength.

The angular dispersion of differing frequencies can be increased by decreasing the grating spacing $a$; and, for best performance, the blaze angle $\theta_B$ between the grating elements would be changed correspondingly so that the grating will still be blazed for the selected wavelength.

However, resolving power is directly related to the difference in optical path from one edge of the ruled area to the other, that is, the size of the grating, provided that the spacing of the grating elements 21 is constant over the entire ruled area. It is thus desirable to have a large grating area.

In the case of the $N_2$-$CO_2$ laser operating at $10.6\mu$, I suggest the use of a grating having 75 grooves per millimeter and a blaze angle of 26°45', a typical commercially available grating. With a grating area of 100 millimeters in the direction of the grooves times 200 millimeters across the grooves, the apparatus of FIG. 1 should discriminate laser wavelengths as closely spaced as 7 A. This wavelengt hspacing corresponds to a resolution of about 1:15,000, which is more than adequate for selecting any of the $N_2$-$CO_2$ or $N_2$-$N_2O$ laser lines. As needed, increased resolution can be obtained by employing a grating having a greater dimension across the grooves.

It will be perceived that for wavelengths very close to $\lambda_B$ even the angular dispersion provided by grating elements 21 may not suffice to cause them to miss reflector 19 entirely. Nevertheless, the partially transmissive reflector 19 acts as the aperture of a spectrometer in the following manner:

Radiation of the wavelength $\lambda_B$ tends to strike the reflector 19 centrally, that is upon the axis of laser 11. Even so, the curvature of reflector 19 and the reverse direction of transmission of light through reflector 19 cause this reflector to defocus the radiation, in contrast to its normal focusing action for radiation that remains within the resonator. The slightly variant wavelengths will not strike reflector 19 as centrally as the selected wavelength and therefore will be defocused to an even greater extent. In this respect, the action of reflector 19 with respect to grating 20 is very similar to the diffraction effect provided by a slit or the aperture of a spectrometer. The selected wavelength, which passes in the preferred direction centrally through the effective aperture, will be amplified more strongly by the active medium of laser 11 than will any radiation that is defocused to a greater extent.

The reflection grating 20 may be viewed as modulating the reflectivity of reflector 19 in a way that is highly dependent upon wavelength. The increase in resolution, however, is much greater than that which could be obtained by replacing reflector 19 by a grating in order to provide a means for modulating its reflectivity. The essential difference in resolution is provided by the action of the curved reflecting element 19 which acts as the effective aperture of a spectrometer.

While the light beam passing through reflector 19 toward grating 20 has been described as spreading because of diffractive effects, it should be understood that the separation of reflector 19 and grating 20 may be materially reduced by introducing a defocusing element such as a concave lens therebetween. The operation of the embodiment of FIG. 1 as thus modified would otherwise be substantially similar to the just described.

While the embodiment of FIG. 1 has been described primarily with reference to laser oscillators, it will be understood that with an appropriate increase in the transmissivity of reflectors 18 and 19, the embodiment of FIG. 1 may operate as a regenerative amplifier. In a regenerative amplifier, the frequency selection provided by the embodiment of FIG. 1 is useful because the oscillation threshold is different for different frequencies. Thus, the laser might otherwise burst into oscillation at a neighboring wavelength while regeneratively amplifying the desired wavelength. The diffractive feedback provides that the desired wavelength will always be amplified most strongly. In order to keep the apparatus operating below the oscillation threshold for the desired wavelength, an electro-optic cell such as a Kerr cell would be disposed between aligned polarizers between reflector 19 and the grating assembly 20. The voltage between its electrodes, and hence its effective polarization modulation, would be controlled in proportion to the detected intensity of the resonated radiation within the resonator formed by reflectors 18 and 19. To this end, a largely transmissive parallel-face etalon would be disposed obliquely in the beam path within the resonator and, by reflection, would direct a small portion of the radiation to a photodetector outside of the resonator. By adjusting the sensitivity of the photodetector, or some other feedback constant in the control loop, the regenerative amplification would be kept below the oscillation threshold.

It will be noted that a regenerative laser amplifier will amplify a reflected signal as well as the incident signal radiation. Thus an incident signal radiation may be introduced through reflector 18 and the amplified signal radiation may also be abstracted through reflector 18.

Although one problem to which the invention is directed occurs in its most accentuated form in a gaseous laser, it should be understood that the invention is equally applicable to lasers utilizing solid and liquid active media and will provide equally good resolution of closely spaced laser frequencies.

Transmission gratings can also be used to implement the invention as illustrated in the embodiment of FIG. 2. Laser 11 and its associated apparatus is identical to that disclosed above in connection with the embodiment of FIG. 1. The transmission grating 40 is disposed external to the laser resonator beyond reflector 19 and is centrally located upon the laser axis. The transmission grating 40 includes the grating elements 41 which may be plastic as disclosed in FIG. 1 but which have no aluminized surfaces. Likewise they are bonded to the glass or other transparent substrate 42 but with a transparent bonding material. The particular substrate is chosen for its transparency at the desired frequency; for example, at 10.6μ, crystalline ZnS can be used. A central grating element 41 is coupled to appropriate control means in the same manner as disclosed in the embodiment of FIG. 1. It will be noted that the transmission grating 40 is disposed between the reflector 19 and a secondary reflector 52. The angle Φ between the grating normal and the axis of laser 11 is determined by refraction in substrate 42 and elements 41, as well as by the desired angle of passage through the groove faces of the elements 41, as explained hereinbefore. Secondary reflector 52 should provide the appropriate curvature to make the divergent light incident thereon return toward grating 40 as essentially parallel rays. As mentioned in connection with embodiment of FIG. 1, defocusing concave lens 39 is disposed beyond reflector 19 in order to shorten the optical distance between the reflectors 19 and 52. Since the grating 40 is planar, a convex lens 59 is disposed beyond lens 39 to direct parallel rays of light over the entire ruled area of grating 40. It is apparent that in this embodiment the transmission grating 40 acts upon the light rays transmitted through it twice. The net effect is to spatially disperse differing wavelengths of light that are transmitted back toward reflector 19, although the dispersion is not linear for this type of grating because the prism dispersion of substrate 42 and elements 41 are added to the grating dispersion. The selected wavelength $\lambda_B$ is again passed through reflector 19 in a preferred direction more nearly normal to reflector 19 than are neighboring wavelengths and thus tends to be reinforced more strongly by the active material in tube 12 as it is resonated by reflectors 18 and 19. Reflector 19 again acts as the aperture of a spectrometer inasmuch as it defocuses the normally incident radiation to a lesser extent than the defracted radiation which is incident at slight angles with respect to the axis of laser 11. The selected wavelength $\lambda_B$ of the returned radiation will pass through the active medium of laser 11 in the preferred direction and will have a larger portion of essentially parallel rays passing therethrough than will any different wavelength.

It will be noted that while the curved focusing element 19 provides an effective aperture, this aperture is not sharply defined in spatial extent nor does it provide its aperturing effect only in the dimension in which it is desired. More specifically, there is no need for providing any aperturing of the beam in the direction of elongation of the grating elements. In fact, it may be desirable to leave the beam broad in this dimension to tend to compensate for minor imperfections in the grating elements. To this end, the action of reflector 19 as an aperture may be supplemented or replaced by a specially adapted aperture or iris as shown in the modified embodiment of FIG. 3.

In FIG. 3, laser 11 is substantially the same as in FIGS. 1 and 2; and a reflection grating is employed as in FIG. 1, but with the modifications that divergent light rays emerge from a controllable iris 70 and are focused to strike the grating essentially as parallel rays by a separate focusing element 53 which is suitably disposed with respect to the planar grating 60. Further, a second controllable iris 80 backed by a focusing reflector 89 is disposed with respect to reflector 53 to receive as convergent rays therefrom the desired wavelength diffracted by grating 60. Reflector 89 focuses the central (least diffracted) rays passed by iris 80 to return them therethrough. The back side of apertures 70 and 80 are painted black to prevent stray undesired reflections. The controllable irises 70 and 80 provide slits which are elongated to pass light reflected from any position along each of the grating elements 61. Both slits diffract light ray in the plane of a cross section of the grating elements 61 but do not diffract them in directions which would take them out of such a plane. Thus, a fairly broad beam is passed by irises 70 and 80, the elongation of the beam being in the direction in which the grating elements 61 provide no wavelength selectivity.

Illustratively, as shown in FIG. 4, the controllable iris 70 is provided by two opposed metal knife edges 73, the blades of which can travel toward or away from the extended axis of laser 11 by rotation of a threaded element or screw 72. Thus, the internally threaded mountings 74 for the knife blades 73 move vertically upon the threaded element 72, which pivots freely in the fixed end mounting 75. The threaded element 72 is rotated by the knurled knob 76, which may be turned manually. As can be seen in FIG. 4, a separate nonthreaded guide 77 may be provided to keep the blades 73 from rotating with rotation of the screw 72. Thus, separate mountings 78 attached to the blades 73 slide freely on the guide 77. Controllable iris 80 is made in the same manner. It may be seen that the defocusing action of reflector 19 may now be made less strong or eliminated and that the function of the aperture may be provided primarily in the only direction in which it is useful for wavelength or frequency selection. Moreover, the bandwidth of the amplified radiation may now be continuously and accurately adjusted. The use of tandem controllable irises provides a much greater sensitivity of adjustment that can be provided with a single iris. In all other significant respects, the operation of the embodiment of FIG. 3 is substantially the same as that of FIG. 1.

In any event, it will be understood that modifications of the described embodiments of the invention can be made by those skilled in the art without departing from the spirit and scope of the invention. For example, the invention is useful with both continuous-wave and pulsed lasers. Similarly, electronically controllable diffraction gratings and irises could be used in practicing the invention. For example, acoustic gratings such as disclosed in the copending application of Tell et al., Ser. No. 459,856, filed May 28, 1965, now U.S. Patent No. 3,365,581, issued Jan. 23, 1968, and assigned to the assignee could be employed as a transmission grating in apparatus according to the invention. Electrooptic diffraction gratings of the type disclosed in the copending application of E. I. Gordon, Ser. No. 377,353, filed June 23, 1964, and assigned to the assignee hereof, could likewise be used as a transmission grating.

Moreover, the embodiments of FIGS. 2 and 3 can be adapted for regenerative amplification in the same manner as described above for the embodiment of FIG. 1.

What is claimed is:

1. Apparatus adapted for the stimulated emission of radiation, comprising a molecular active medium capable of a plurality of simultaneous stimulated radiative vibrational-rotational transitions, means for pumping said active medium to enable said simultaneous transitions, an optical resonator disposed about said active medium to resonate differing-frequency radiations from said simultaneous transitions and to transmit portions of said resonated differing-frequency radiations, a diffraction grating apparatus disposed outside of said resonator to intercept said transmitted portions of said differing-frequency radiations, said grating apparatus including a grating adapted to provide substantial angular dispersion among said transmitted portions and including means for returning said transmitted portions toward said resonator, said resonator including means for further angularly dispersing the returned transmitted portions.

2. Apparatus according to claim 1 in which the molecular active medium includes carbon dioxide gas, the means for further angularly dispersing the transmitted portions of the differing-frequency radiations comprises a partially transmissive reflector having a concave surface facing said active medium, and the diffraction-grating apparatus is disposed beyond said reflector to return a radiation of selected frequency toward the active medium over an optical pathlength substantially greater than the optical pathlength of the resonator, said diffraction-grating apparatus including focusing means for providing substantially like angles of initial incidence of said transmitted portions of said radiations over a substantial area of said grating.

3. Apparatus according to claim 2 in which the grating has elements spaced apart less than twice the wavelength of any of the different radiations.

4. Apparatus according to claim 3 in which the diffraction-grating apparatus comprises a reflection grating having a concave arrangement of elements facing toward the partially transmissive reflector, said reflection grating being spaced from said reflector a distance substantially larger than the length of the resonator in the direction of light propagation.

5. Apparatus according to claim 3 in which the diffraction-grating apparatus comprises a transmission grating and in which the means for returning transmitted portions of the different radiations toward the active medium comprises a second reflector separated from said transmission grating and disposed to intercept the portions of radiations passed through said grating and to return said portions through said grating toward the active medium.

References Cited
UNITED STATES PATENTS
3,248,660    4/1966    Fajans _____ 331—94.5

FOREIGN PATENTS
984,590    2/1965    Great Britain.

OTHER REFERENCES
Foster et al., Laser Mode Locking by an External Doppler Cell, Appl. Phys. Letters, Vol. 6, No. 1 (Jan. 1, 1965), pp. 6–8.

RONALD L. WIBERT, *Primary Examiner.*

W. L. SIKES, *Assistant Examiner.*

U.S. Cl. X.R.

350—162